United States Patent
Kim et al.

(10) Patent No.: US 12,282,220 B2
(45) Date of Patent: Apr. 22, 2025

(54) OPTICAL STACK, AND MANUFACTURING METHOD FOR SAME, AND SMART WINDOW INCLUDING SAME, AND AUTOMOBILE OR WINDOWS FOR BUILDING USING SAME

(71) Applicant: DONGWOO FINE-CHEM CO., LTD., Iksan-si (KR)

(72) Inventors: Hyun-Seong Kim, Iksan-si (KR); Jin-Ho Kim, Iksan-si (KR); Hyun-Sun Ryu, Iksan-si (KR); Ju-Seob Choi, Iksan-si (KR)

(73) Assignee: DONGWOO FINE-CHEM CO., LTD., Iksan-si (KR)

( * ) Notice: Subject to any disclaimer, the term of this patent is extended or adjusted under 35 U.S.C. 154(b) by 0 days.

(21) Appl. No.: 18/416,438

(22) Filed: Jan. 18, 2024

(65) Prior Publication Data
US 2024/0288729 A1   Aug. 29, 2024

(30) Foreign Application Priority Data
Feb. 28, 2023   (KR) .................. 10-2023-0027256

(51) Int. Cl.
| G02F 1/1335 | (2006.01) |
|---|---|
| G02F 1/1334 | (2006.01) |
| G02F 1/1337 | (2006.01) |
| G02F 1/1343 | (2006.01) |
| G02F 1/139 | (2006.01) |
| E06B 9/24 | (2006.01) |

(52) U.S. Cl.
CPC .... G02F 1/133528 (2013.01); G02F 1/13345 (2021.01); G02F 1/133784 (2013.01); G02F 1/13439 (2013.01); G02F 1/1396 (2013.01); E06B 9/24 (2013.01); E06B 2009/2417 (2013.01)

(58) Field of Classification Search
CPC ........... G02F 1/133528; G02F 1/13345; G02F 1/133784; G02F 1/13439; G02F 1/1396; E06B 9/24
See application file for complete search history.

(56) References Cited

U.S. PATENT DOCUMENTS

| 2010/0045909 A1* | 2/2010 | Shutou | G02B 5/3083 349/118 |
|---|---|---|---|
| 2018/0134065 A1* | 5/2018 | Tompkin | G03H 1/0011 |
| 2022/0390786 A1* | 12/2022 | Lin | G02F 1/13345 |

FOREIGN PATENT DOCUMENTS

| CN | 110596961 A | 12/2019 |
|---|---|---|
| JP | 2018-10035 A | 1/2018 |
| KR | 10-2022-0164292 A | 12/2022 |
| KR | 10-2023-0012745 A | 1/2023 |

OTHER PUBLICATIONS

Extended European search report issued on Jun. 25, 2024, in counterpart European Patent Application No. 24152129.3 (10 pages).

* cited by examiner

Primary Examiner — James A Dudek
(74) Attorney, Agent, or Firm — NSIP Law

(57) ABSTRACT

A variable transmittance optical stack, a manufacturing method therefor, a smart window including the same, and windows for an automobile or a building using the same are proposed.

12 Claims, 2 Drawing Sheets

OPTICAL STACK, AND MANUFACTURING METHOD FOR SAME, AND SMART WINDOW INCLUDING SAME, AND AUTOMOBILE OR WINDOWS FOR BUILDING USING SAME

CROSS REFERENCE TO RELATED APPLICATION

The present application claims priority to Korean Patent Application No. 10-2023-0027256, filed Feb. 28, 2023, the entire contents of which are incorporated herein for all purposes by this reference.

BACKGROUND OF THE INVENTION

Field of the Invention

The present disclosure relates to a variable transmittance optical stack, a manufacturing method therefor, a smart window including the same, and windows for an automobile or a building using the same.

Description of the Related Art

In general, there are many cases in which an external light blocking coating is applied to a window of a means of transportation such as a vehicle. However, a transmittance of a conventional window of a means of transportation is fixed, and a transmittance of the external light blocking coating is also fixed. Therefore, the entire transmittance of the conventional window of the means of transportation is fixed, thereby causing an accident. For example, when the entire transmittance is preset low, there is no problem during day when ambient light is sufficient. However, there is a problem in that it is difficult for a driver or the like to properly check the surroundings of the means of transportation at night when ambient light is insufficient. Alternatively, when the entire transmittance is preset high, there is a problem of causing glare to a driver or the like during day when ambient light is sufficient. Accordingly, a variable transmittance optical stack capable of changing the transmittance of light when a voltage is applied has been developed.

The variable transmittance optical stack is driven by varying the transmittance by driving liquid crystal according to application of voltage, and the variable transmittance optical stack developed up to date is manufactured with a spacer in a liquid crystal layer to maintain a cell gap of the liquid crystal layer.

For example, Japan patent application publication No. 2018-010035 disclosed a variable transmittance optical stack that also uses a liquid crystal layer including a column spacer or a ball spacer in order to maintain a predetermined cell gap.

However, when the column space is included in the liquid crystal layer, as a manufacturing process becomes more complex, manufacturing costs increase, and as an alignment film is damaged in a process of emitting UV rays to a photoresist and forming a spacer, the transmittance is changed, which are problems. Furthermore, when a ball spacer is used to maintain a cell gap of the liquid crystal layer, it is impossible to solidly maintain a cell gap and it is difficult to maintain a uniform optical color in plane, and a current short circuit of the optical stack occurs, which are problems.

Therefore, a variable transmittance optical stack that can maintain a robust cell gap without using a spacer in a liquid crystal layer needs to be developed.

Documents of Related Art (Patent Document 1) Japan Patent Application Publication No. 2018-010035

SUMMARY OF THE INVENTION

The present disclosure is intended to provide a variable transmittance optical stack capable of preventing a damage to an alignment film due to use of a spacer or a problem of difficulty in maintaining a consistent in-plane optical color, while including a liquid crystal layer containing a polymer network.

Another objective of the present disclosure is to provide a variable transmittance optical stack capable of adjusting transmittance of incident light, while including a liquid crystal layer containing a polymer network and a liquid crystal compound arranged with uniform initial alignment.

Yet another objective of the present disclosure is to provide a variable transmittance optical stack with a simplified manufactured process by not including a separate or additional substrate for forming a conductive layer.

Still another objective of the present disclosure is to provide a variable transmittance optical stack in which the thickness is significantly reduced by no including a separate or additional substrate for forming a conductive layer.

Still another objective of the present disclosure is to provide a variable transmittance optical stack in which transmittance thereof is improved in a light transmissive mode without a separate or additional substrate for forming a conductive layer.

Still another objective of the present disclosure is to provide a smart window including the variable transmittance optical stack, and a vehicle or building window to which the same is applied.

However, the problem to be solved by the present disclosure is not limited to the problems mentioned above, and other problems not mentioned will be clearly understood by those skilled in the art from the description below.

The present disclosure relates to a variable transmittance optical stack, which includes: a first polarizing plate; a first transparent conductive layer formed on the first polarizing plate; a first alignment film formed on the first transparent conductive layer; a second polarizing plate opposite to the first polarizing plate; a second transparent conductive layer formed on one surface of the second polarizing plate, and opposite to the first transparent conductive layer; a second alignment film formed on the second transparent conductive layer; and a liquid crystal layer provided between the first alignment film and the second alignment film, wherein the liquid crystal layer may contain a polymer network and a liquid crystal compound, and the liquid crystal compound may be arranged with uniform initial alignment.

In a first aspect of the present disclosure, a liquid crystal operating method of the liquid crystal layer may be any one selected from a group consisting of a twisted nematic mode (TN), a super twisted nematic (STN) mode, an in-plane switching (IPS) mode, a fringe-field mode, and a vertical alignment mode.

In a second aspect of the present disclosure, the liquid crystal operating method of the liquid crystal layer may be the twisted nematic mode.

In a third aspect of the present disclosure, the liquid crystal layer may contain a cured product of a composition for forming the liquid crystal layer, which contains a polymerizable monomer and a liquid crystal compound.

In a fourth aspect of the present disclosure, the composition for forming the liquid crystal layer may contain 10 to 30% by weight of the polymerizable monomer with respect to the total weight of the composition.

In a fifth aspect of the present disclosure, the first alignment film and the second alignment film may be aligned by a rubbing manner.

In a sixth aspect of the present disclosure, each of the first transparent conductive layer and the second transparent conductive layer may contain one or more types selected from a group consisting of transparent conductive oxide, metal, carbonaceous material, conductive polymers, conductive ink, and nanowires.

In a seventh aspect of the present disclosure, at least one transparent conductive layer of the first transparent conductive layer and the second transparent conductive layer may be formed by directly contacting with any one polarizing plate of the first polarizing plate and the second polarizing plate without a separate or additional substrate between the polarizing plate and the transparent conductive layer.

In an eighth aspect of the present disclosure, at least one transparent conductive layer of the first transparent conductive layer and the second transparent conductive layer may be formed by directly contacting with any one polarizing plate of the first polarizing plate and the second polarizing plate with a highly adhesive layer between the polarizing plate and the transparent conductive layer.

In a ninth aspect of the present disclosure, at least one polarizing plate of the first polarizing plate and the second polarizing plate may include one or more types of functional layers selected from a group consisting of a protective layer, a retardation matching layer, and a refractive index-matching layer.

In a tenth aspect of the present disclosure, each of the first polarizing plate and the second polarizing plate may have a thickness ranged from 30 µm to 200 µm.

In an eleventh aspect of the present disclosure, the variable transmittance optical stack may include one or more types selected from a group consisting of a pressure sensitive adhesive/adhesive layer, an ultraviolet ray absorption layer, and a hard coating layer.

The present disclosure relates to a manufacturing method for the variable transmittance optical stack.

The present disclosure relates to a smart window including the variable transmittance optical stack.

The present disclosure relates to an automobile in which the smart window is applied to at least one of a front window, a rear window, a side window, a sunroof window, and an inner partition thereof.

The present disclosure relates to a window for a building including the smart window.

According to the present disclosure, in the variable transmittance optical stack, the liquid crystal layer containing the polymer network is included and a damage to the alignment film due to use of a conventional spacer or a problem of difficulty in maintaining a consistent in-plane optical color are prevented, so that driving stability thereof can be improved compared to the conventional optical stack.

According to the present disclosure, in the variable transmittance optical stack, even when the polymer network is formed in the liquid crystal layer, the liquid crystal compound may be aligned with maintaining uniform initial alignment, so that adjustment of transmittance of light incident to the optical stack can be performed.

Furthermore, the variable transmittance optical stack according to the present disclosure is configured to omit the process of forming a conductive layer on a substrate for the conventional optical stack and bonding the conductive layer and other members, so the manufacturing process thereof can be simplified in comparison to the conventional optical stack manufacturing process.

The variable transmittance optical stack according to the present disclosure does not include a separate or additional substrate for forming the conductive layer as the conductive layer is directly formed on one surface of the polarizing plate, so that the thickness thereof may be significantly reduced in comparison to the thickness of the conventional optical stack.

The variable transmittance optical stack according to the present disclosure does not include a separate or additional substrate for forming the conductive layer as the conductive layer is directly formed on one surface of the polarizing plate, so that transmittance in the light transmissive mode may be improved in comparison to the thickness of the conventional optical stack.

DETAILED DESCRIPTION OF THE DISCLOSURE

Figure 1:
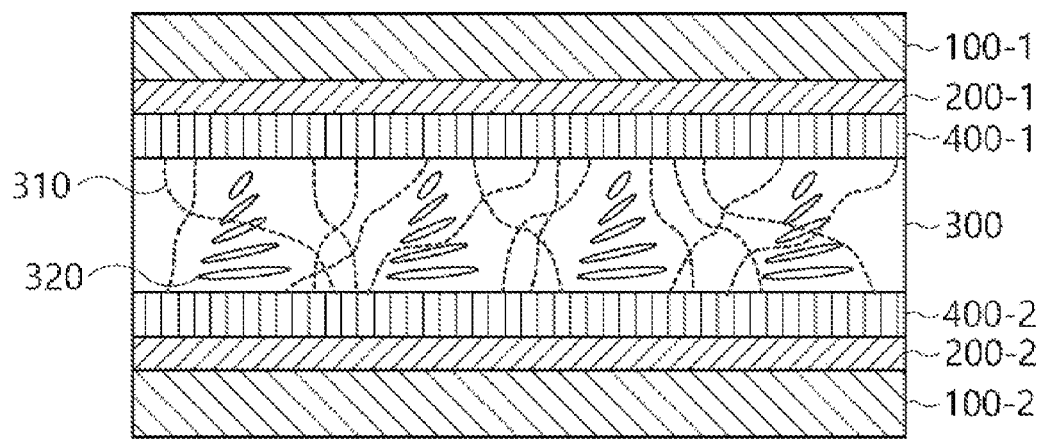
FIG. 1 is a view showing a stack structure of a variable transmittance optical stack according to an embodiment of the present disclosure.

The present disclosure relates to a variable transmittance optical stack including a liquid crystal layer containing a polymer network and liquid crystal compounds arranged with uniform initial alignment, specifically, the present disclosure relates to a variable transmittance optical stack that is capable of preventing a problem according to use of conventional sealants and spacers while maintaining a cell gap of a liquid crystal layer by a polymer network in the liquid crystal layer and of adjusting transmittance of light incident to the optical stack as liquid crystal compounds are arranged with uniform initial alignment.

More specifically, the present disclosure relates to a variable transmittance optical stack, which includes: a first polarizing plate; a first transparent conductive layer formed on one surface of the first polarizing plate; a first alignment film formed on the first transparent conductive layer; a second polarizing plate opposite to the first polarizing plate; a second transparent conductive layer formed on one surface of the second polarizing plate, and opposite to the first transparent conductive layer; a second alignment film formed on the second transparent conductive layer; and a liquid crystal layer provided between the first alignment film and the second alignment film, and the liquid crystal layer contains a polymer network and a liquid crystal compound, and the liquid crystal compound is aligned with uniform initial alignment.

The variable transmittance optical stack of the present disclosure is particularly suitable for technical fields where a light transmittance can be changed in response to application of voltage, for example, may be used for a smart window, etc.

The smart window is an optical structure controlling the amount of light or heat passing through the window by changing a light transmittance in response to an electrical signal. In other words, the smart window is provided to be changed into a transparent, opaque or translucent state by voltage and is called variable transmittance glass, lighting control glass, or smart glass.

The smart window may be used as partitions for partitioning an internal space of vehicles and buildings or for protecting privacy, or as skylights arranged in openings of buildings, and may be used as highway signs, noticeboards, scoreboards, clocks or advertising screens, and may be used to replace glass of a means of transportation, such as windows or sunroof windows of cars, buses, aircrafts, ships, or trains.

The variable transmittance optical stack of the present disclosure may also be used for the smart window of the various technical fields mentioned above, but since the conductive layer is directly formed in the polarizing plate, there is no need to include a separate or additional substrate for forming the conductive layer and the thickness thereof is thin and is advantageous in the flexuosity, so the optical stack of the present disclosure may be used to be particularly suitable for a smart window of a vehicle or a building. According to one or a plurality of embodiments, the smart window to which the variable transmittance optical stack of the present disclosure is applied may be used for front windows, rear windows, side windows, and sunroof windows of a vehicle, or windows for a building. Furthermore, the smart window may be used to not only an external light blocking use, but also an internal space partitioning use or a privacy protecting use such as an inner partition for a vehicle or a building.

Hereinbelow, embodiments of the present disclosure will be described in detail with reference to drawings. However, the following drawings accompanying to this specification illustrate preferred embodiments of the present disclosure, and serve to further understand the technical idea of the present disclosure with the contents of the above-described invention. Therefore, the present disclosure should not be construed as being limited to material described in the drawings.

Terms used in this specification are selected to describe embodiments and thus do not limit the present disclosure. In this specification, an element expressed in a singular form may be a plural element unless it is necessarily singular in the context. For example, "the polarizing plate" used in the specification may mean at least one polarizing plate of the first polarizing plate and the second polarizing plate, and "the transparent conductive layer" may mean at least one transparent conductive layer of the first transparent conductive layer and the second transparent conductive layer.

As used herein, the terms "comprise" and/or "comprising" do not mean the exclusion of the presence or absence of one or more components, steps, movements, and/or elements other than a component, a step, movement, and/or an element mentioned above. The same reference numerals are used throughout the specification to designate the same or similar elements.

Spatially relative terms "below", "lower surface", "lower portion", "above", "upper surface", "upper portion" may be used to easily describe the correlation between "one element or components" and "another element or other components", as shown in drawings. The spatially relative terms should be understood as terms including different directions of an element when being used or operated in addition to a direction shown in the drawings. For example, when an element shown in the drawings is turned over, the element described as being "below" or "lower" concerning another element may be placed "on" the another element. Accordingly, the exemplary term "below" may include both downward and upward directions. An element may be aligned in a different direction, and accordingly, the spatially relative terms may be interpreted according to alignment.

The "planar direction" used in this specification may be interpreted as a direction perpendicular to a polarizing plate and/or a transparent conductive layer, that is, a direction viewed from the user's view side.

FIG. 1 is a view showing a stack structure of a variable transmittance optical stack according to an embodiment of the present disclosure. FIGS. 2A to 2E are views each showing a stack structure of a polarizing plate according to one or a plurality of embodiments of the present disclosure. FIG. 3 is a stack structure of a variable transmittance optical stack according to another embodiment of the present disclosure.

Referring to FIG. 1, the variable transmittance optical stack according to the embodiment of the present disclosure includes a first polarizing plate 100-1, a second polarizing plate 100-2, a first transparent conductive layer 200-1, a second transparent conductive layer 200-2, a liquid crystal layer 300, a first alignment film 400-1, and a second alignment film 400-2.

Referring to FIG. 2, a polarizing plate 100 includes a polarizer 110, and on one or both surfaces of the polarizer 110, may include a functional layer such as a protective layer 120, a retardation matching layer 130, a refractive index-matching layer 140, etc. For example, the polarizing plate 100 may include the polarizer 110 and the protective layer 120 stacked on one or both surfaces of the polarizer 110 (referring to FIGS. 2A and 2B), and may include the polarizer 110, the protective layer 120 stacked on a first surface of the polarizer 110, and the retardation matching layer 130 stacked on a second surface of the polarizer 110 (referring to FIG. 2C), the second surface facing the first surface, and may include the polarizer 110, the protective layer 120 stacked on a first surface of the polarizer, and the retardation matching layer 130 and the refractive index-matching layer 140 successively stacked on a second surface of the polarizer 110 (referring to FIG. 2D), the second surface facing the first surface, may include the polarizer 110, the protective layer 120 stacked a first surface of the polarizer, and the protective layer 120 and the retardation matching layer 130 successively stacked on a second surface of the polarizer 110 (referring to FIG. 2E), the second surface facing the first surface.

The polarizer 110 may use a polarizer currently developed or to be developed, and, for example, may use a stretched polarizer, a coatable polarizer, etc.

According to the embodiment, the stretched polarizer may contain a stretched polyvinyl alcohol (PVA)-based resin. The PVA-based resin may be PVA-based resin obtained by saponifying polyvinyl acetate resin. In addition to polyvinyl acetate that is homopolymer of vinyl acetate, vinyl acetate and a copolymer with other monomers that can be copolymerized with vinyl acetate may be used as the polyvinyl acetate-based resin. As the other monomers, unsaturated carboxylic acid-based monomers, unsaturated sulfonic acid-based monomers, olefin-based monomers, vinyl ether-based monomers, acrylamide having ammonium groups-based monomers, and the like may be used. Furthermore, the PVA-based resin contains a denatured resin, and for example, may be polyvinyl formal or polyvinyl acetal denatured into aldehyde.

According to the embodiment, the coatable polarizer may be formed of a composition for liquid crystal coating, and, at this point, the composition for liquid crystal coating may contain reactive liquid crystal compound, and dichroic dye, etc.

The reactive liquid crystal compound may mean a compound, for example, containing a mesogen frame, etc., and also containing one or more polymerizable functional groups. The reactive liquid crystal compound may be variously known by the name reactive mesogen (RM). The reactive liquid crystal compound may constitute a cured film with a polymer network formed while being polymerized by light or heat and maintaining a liquid crystal arrangement.

The reactive liquid crystal compound may be a mono-functional liquid crystal compound or a multi-functional liquid crystal compound. The mono-functional liquid crystal compound is a compound having 1 polymerizable functional group, and a multi-functional liquid crystal compound may mean a compound having two or more polymerizable functional groups.

The dichroic dye is a substance contained in the composition for liquid crystal coating to impart the polarization characteristic and has a property in which absorbance in a direction of the long axis of a molecule and absorbance in a direction of the short axis are different. The dichroic dyes may adopt dichroic dyes currently developed or to be developed and may contain one or more types of dyes selected from a group consisting of azo dyes, anthraquinone dyes, perylene dyes, merocyanine dyes, azomethine dyes, phthaloperylene dyes, indigo dyes, dioxazine dyes, polythiophene dyes, and phenoxazine dyes.

The composition for liquid crystal coating may contain a solvent capable of dissolving the reactive liquid crystal compound and the dichroic dye. For example, propylene glycol monomethyl ether acetate (PGMEA), methyl ethyl ketone (MEK), xylene, chloroform, and the like may be used. Furthermore, the composition for liquid crystal coating may contain leveling agents, polymerization initiators, etc. within a range that does not deteriorate the polarization properties of a coating film.

The protective layer 120 is provided to preserve the polarization characteristic of the polarizer 110 from a post-processing and external environment and may be implemented into a form such as a protective film, etc.

Figure 2A:
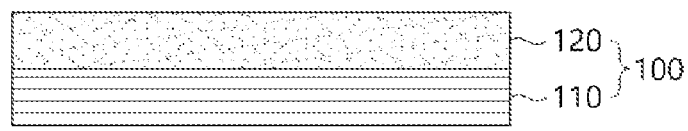
FIGS. 2A to 2E are views each showing a stack structure of a polarizing plate according to one or a plurality of embodiments of the present disclosure.
Figure 2B:
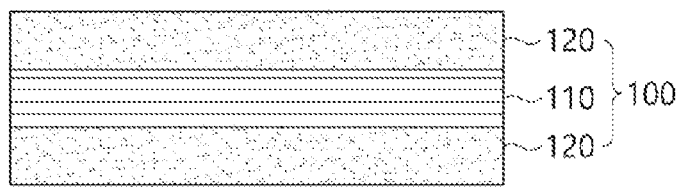
Figure 3:
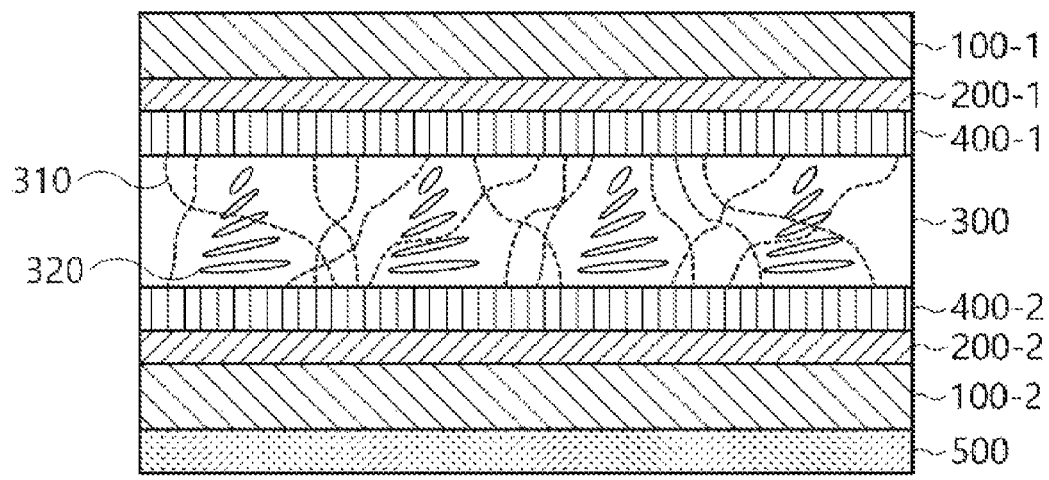
FIG. 3 is a stack structure of a variable transmittance optical stack according to another embodiment of the present disclosure.

As shown in FIGS. 2A and 2B, the protective layer 120 may be formed by directly contacting with one or both surfaces of the polarizer 110 but is not limited thereto. For example, the protective layer may be used as a double-layer structure in which one or more protective layers are successively stacked and may be formed in direct contact with another functional layer.

According to one or a plurality of embodiments, the protective layer may contain one or more types selected from a group consisting of polyethylene terephthalate (PET), polyethylene isophthalate (PEI), polyethylene naphthalate (PEN), polybutylene terephthalate (PBT), diacetyl cellulose, triacetyl cellulose (TAC), polycarbonate (PC), polyethylene (PE), polypropylene (PP), polymethyl acrylate (PMA), polymethyl methacrylate (PMMA), polyethyl acrylate (PEA), polyethyl methacrylate (PEMA), and cyclic olefin polymer (COP).

The retardation matching layer 130 may be provided to complement optical properties of the optical stack, and may be implemented in a retardation film, and a retardation film currently developed or to be developed may be used therefor. For example, a quarter-wave plate (¼ wave plate) or a half-wave plate (½ wave plate) may be used to delay a phase difference of light and may be used alone or in combination.

Figure 2C:
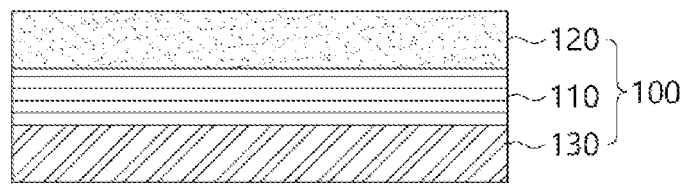
Figure 2D:
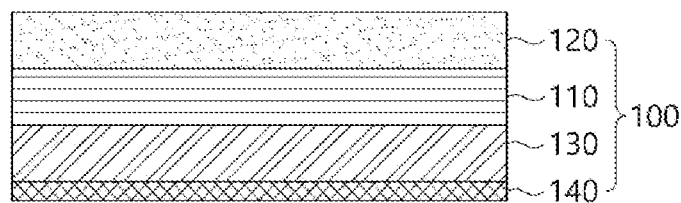
Figure 2E:
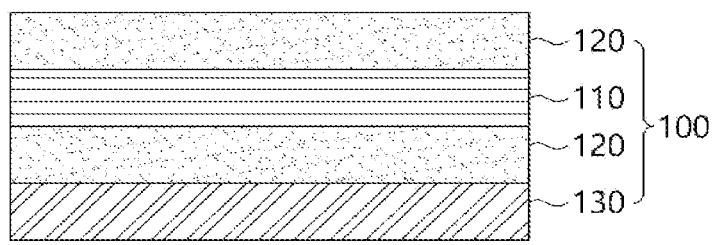

As shown in FIGS. 2C and 2D, the retardation matching layer 130 may be formed by directly contacting with one surface of the polarizer 110 but is not limited thereto. For example, as shown in FIG. 2E, the retardation matching layer 130 is formed on one surface of the protective layer 120, and the polarizer 110, the protective layer 120, and the retardation matching layer 130 may be successively stacked.

The retardation matching layer 130 may be a polymer stretched film or a liquid crystal polymerized film, formed by stretching a polymer film that can impart optical anisotropy by stretching in an appropriate manner.

According to the embodiment, the polymer stretched film may use a polymer layer containing polyolefin such as polyethylene (PE), polypropylene (PP), etc., cyclo olefin polymer (COP) such as polynorbornene, etc., polyester such as polyvinyl chloride (PVC), polyacrylonitrile (PAN), polysulfone (PSU), acryl resin, polycarbonate (PC), polyethylene terephthalate (PET), etc. and cellulose ester polymer such as polyacrylate, polyvinyl alcohol (PVA), triacetyl cellulose (TAC), etc., or a copolymer of two or more monomers among monomers that can form the polymers.

A method for obtaining the polymer stretched film is not particularly limited and, for example, may be obtained by forming the polymer material into a film shape and then stretching the material. The molding method for the film shape is not particularly limited, and the polymer stretched film may be formed in the known methods such as injection molding, sheet molding, blow molding, injection blow molding, inflation molding, extrusion molding, foaming molding, cast molding, etc., and may be formed in a secondary processing molding method such as pressure molding, vacuum molding, etc. Among them, extrusion molding and cast molding may be preferably used. At this point, for example, an unstretched film may be extruded by using an extruder to which a T-die, a circular die, etc., may be mounted. When a molded product is obtained in extrusion molding, a material made by melt-kneading various resin components, additives, etc., in advance, may be used and the molded product may be formed by melt-kneading during extrusion molding. Furthermore, various resin components are dissolved by using a common solvent, for example, a solvent such as chloroform, 2 methylene chloride, etc., and then are solidified in a cast dry manner, and accordingly, the non-stretched film may be cast-molded.

The polymer stretched film may be provided by performing uniaxial stretching with respect to the molded film in a mechanical direction (MD, longitudinal or length direction), and by performing uniaxial stretching in a direction (TD, transverse direction or width direction) perpendicular to the MD, and furthermore, the molded film is stretched in a sequential biaxial stretching method of roll stretching and tenter stretching, a simultaneous biaxial stretching method of tenter stretching, a biaxial stretching method of tubular stretching, etc., so that a biaxial stretched film may be manufactured.

The liquid crystal polymerized film may contain a reactive liquid crystal compound in a polymerized state. The description of the reactive liquid crystal compound of the coatable polarizer described above may be equally applied to the reactive liquid crystal compound.

In one or a plurality of embodiments, the thickness of the retardation matching layer 130 may be a thickness ranges from 10 μm to 100 μm in the polymer stretched film and may be a thickness ranged from 0.1 μm to 5 μm in the liquid crystal polymerized film.

The refractive index-matching layer 140 is provided to compensate for the refractive index difference of the optical stack by the transparent conductive layer 200, and may serve to improve the visible characteristic by reducing the difference of the refractive index. Furthermore, the refractive index-matching layer 140 may be provided to correct a color based on the transparent conductive layer 200. Meanwhile, when the transparent conductive layer has a pattern, the refractive index-matching layer 140 may correct the transmittance difference of a region with the pattern and a non-pattern region without the pattern.

Specifically, the transparent conductive layer 200 is stacked close to other members having a refractive index different therefrom (for example, the polarizer 110, etc.), and due to the difference of the refractive index between the transparent conductive layer and another layer close thereto, the difference of optical transmittance may be caused. Specifically, when the pattern is formed on the transparent conductive layer, there may be a problem in that the pattern region and the non-pattern region are visually distinguished from each other. Therefore, the refractive index-matching layer 140 is included to compensate for a refractive index, thereby reducing the difference with the optical transmittance of the optical stack. Specifically, when the pattern is formed on the transparent conductive layer, the pattern region and the non-pattern region should be provided so as not to be visually distinguished.

According to the embodiment, the refractive index of the refractive index-matching layer 140 may be appropriately selected according to a material of another adjacent member and may preferably range from 1.4 to 2.6, more preferably range from 1.4 to 2.4. In this case, it is possible to prevent optical loss due to a sharp difference in the refractive index between another member such as the polarizer 110 and the transparent conductive layer 200.

The refractive index-matching layer 140 is not particularly limited as long as it can prevent the sharply refractive difference between other members, such as the polarizer 110, etc., and the transparent conductive layer, and may use a compound used in the formation of a refractive index-matching layer currently developed or to be developed. For example, the refractive index-matching layer 140 may be formed from refractive index-matching layer formation composition containing polymerizable isocyanate compound.

According to the embodiment, the polarizing plate 100 may include other functional layers to assist or strengthen the characteristics of the polarizer in addition to the above-mentioned functional layers and, for example, may include an overcoat layer, etc. to further improve the mechanical durability.

According to one or a plurality of embodiments, the polarizing plate 100 may have a thickness ranged from 30 to 200 μm, and preferably, a thickness ranged from 30 to 170 μm, and more particularly, a thickness ranged from 50 to 150 μm. In this case, while the polarizing plate 100 maintains the optical characteristic, the optical stack having a thin thickness can be manufactured.

The transparent conductive layer 200 is provided to drive the liquid crystal layer 300, and may be formed by directly contacting with the polarizing plate 100. For example, as shown in FIG. 1, the first transparent conductive layer 200-1 and the second transparent conductive layer 200-2 may be respectively formed by directly contacting with the first polarizing plate 100-1 and the second polarizing plate 100-2.

Conventionally, an optical stack used to manufacture a smart window, etc. is manufactured by forming a conductive layer for driving a liquid crystal on one surface of a substrate and bonding-coupling a second surface of the substrate to a polarizing plate. However, according to the present disclosure, the variable transmittance optical stack has the conductive layer directly formed on one surface of the polarizing plate without a separate or additional substrate for forming the conductive layer, and thus is characterized to improve the transmittance in a light transmissive mode and the curvature characteristic while reducing the entire thickness of the stack.

According to the embodiment, the transparent conductive layer 200 may be formed by being directly deposited on one surface of the polarizing plate 100. At this point, in order to improve the adhesion between the transparent conductive layer 200 and the polarizing plate 100, the transparent conductive layer 200 may be formed by performing pre-processing such as a corona processing or a plasma processing on one surface of each polarizing plate 100, and then directly contacting with the surface of each polarizing plate 100 to which the pre-processing is performed. The pre-processing is not limited to the corona processing or the plasma processing, and may adopt a pre-processing currently developed or to be developed without harming the purpose of the present disclosure.

According to another embodiment of the present disclosure, in order to improve the adhesion between the transparent conductive layer 200 and the polarizing plate 100, the transparent conductive layer 200 may be formed by directly contacting with each polarizing plate with the highly adhesive layer (not shown) located therebetween, the highly adhesive layer being provided on one surface of each polarizing plate 100. The highly adhesive layer may use a material described as the pressure-sensitive adhesive/adhesive layer among other members to be described below, but is not limited thereto.

The transparent conductive layer 200 is preferably have the transmittance with respect to visible light of 50% or more, and for example, may include one or more types selected from a group consisting of transparent conductive oxide, metal, a carbonaceous material, conductive polymer, conductive ink, and nanowires, but the present disclosure is not limited thereto, and a material of a transparent conductive layer currently developed or to be developed may be used.

According to one or a plurality of embodiments, the transparent conductive oxide may include one or more types selected from a group consisting of indium tin oxide (ITO), indium zinc oxide (IZO), indium zinc tin oxide (IZTO), aluminum zinc oxide (AZO), gallium zinc oxide (GZO), florin tin oxide (FTO), zinc oxide (ZnO), etc. Furthermore, the metal may include one or more types selected from a group consisting of aurum (Au), argentum (Ag), cuprum (Cu), aluminum (Al), platinum (Pt), palladium (Pd), chromium (Cr), titanium (Ti), tungsten (W), niobium (Nb), tantalum (Ta), vanadium (V), iron (Fe), manganese (Mn), cobalt (Co), nickel (Ni), zinc (Zn), alloy containing at least one of them, etc., and for example, may include argentum-palladium-cuprum (APC) alloy or cuprum-calcium (CuCa) alloy. The carbonaceous material may include one or more types selected from a group consisting of carbon nanotube (CNT), graphene, etc., and the conductive polymer may use a conductive polymer material currently developed or to be developed, and for example, may include one or more types selected from a group consisting of polythiophene, poly(3,4-ethylenedioxythiophene), polyaniline, polythiophene, polydiacetylene, polyphenylene, polyphenylenevinylene, polyphenylene sulfide, polythienylenevinylene, polythiophenevinylene, polyfluorene, polypyrrole, poly(3,4-ethylenedioxythiophene):polystyrenesulfonate, poly(3,4-ethylenedioxythiophene):camphorsulfonic acid, poly(3,4-ethylenedioxythiophene):toluenesulfonic acid, poly(3,4-ethylenedioxythiophene):dodecylbenzenesulfonic acid, polyaniline:polystyrenesulfonate, polyaniline:camphorsulfonic acid, polypyrrole:polystyrenesulfonate, polypyrrole:camphorsulfonic acid, polypyrrole:toluenesulfonic acid, polypyrrole:dodecylbenzenesulfonic acid, polythiophene:polystyrenesulfonate, polythiophene:camphorsulfonic acid, polythiophene:toluenesulfonic acid, and polythiophene:dodecylbenzenesulfonic acid, and preferably may be poly(3,4-ethylenedioxythiophene). The conductive ink may be a mixture of metal powder and curable polymer binder, and the nanowires may be for example silver nanowires (AgNW).

Furthermore, the transparent conductive layer 200 may be formed by combining these matters in a structure of two or more layers. For example, in order to reduce the reflectance of incident light and increase the transmittance, the transparent conductive layer may be formed in a structure of two layers including a metal layer and a transparent conductive oxide.

The transparent conductive layer 200 may be formed in a method commonly used in the art and, for example, may be formed using a coating process such as a spin coating method, a roller coating method, a bar coating method, a dip coating method, Gravure coating method, a curtain coating method, a dye coating method, a spray coating method, a doctor coating method, a kneader coating method, etc.; a printing process such as a screen printing method, a spray printing method, an inkjet printing method, a letterpress method, an intaglio printing method, a lithography method, etc.; and a deposition process such as chemical vapor deposition (CVD), physical vapor deposition (PVD), plasma enhanced chemical vapor deposition (PECVD), etc.

The liquid crystal layer 300 may adjust transmittance of light incident in one or a plurality of directions according to electric fields generated by the transparent conductive layer 200 to change a driving mode of the optical stack into the light transmissive mode or a light blocking mode.

The liquid crystal layer 300 may include a polymer network 310 and a liquid crystal compound 320, and for example, may be provided between a first alignment film 400-1 and a second alignment film 400-2 in an optical control area, and may be located in a space provided by the polymer network 310.

The conventional optical stack must include a sealant and a spacer to maintain a cell gap, i.e., a predetermined space in which a liquid crystal compound is provided in the liquid crystal layer. However, when the liquid crystal layer includes a column spacer therein to maintain a cell gap, a manufacturing process is complicated and therefore a manufacturing cost increases, and an alignment film is damaged in a process in which UV rays are emitted to a photo resist to form a spacer, there is not a problem in which transmittance is changed. Furthermore, when a ball spacer is used to maintain a cell gap of the liquid crystal layer, it is impossible to solidly maintain a cell gap and it is difficult to maintain a uniform optical color in plane, and a current short circuit of the optical stack occurs, which are problems. Furthermore, when a sealant is used to maintain a cell gap of the liquid crystal layer, visibility of the sealant may cause deterioration in product appearance, and when handling the optical stack, a burst fault of the sealant may occur or a fault due to a thickness difference between the sealant and a spacer included together may occur, which are problems.

The liquid crystal layer 300 included in the variable transmittance optical stack of the present disclosure contains the polymer network 310 together with the liquid crystal compound 320, thereby appropriately maintaining a cell gap of the liquid crystal layer without a separate sealant and/or a spacer. Furthermore, since maintaining a cell gap is performed with single configuration of the polymer network rather than combination of a sealant and a spacer, a fault due to a thickness difference between the sealant and the spacer can be fundamentally prevented, which is an advantage.

The liquid crystal compounds are driven in response to electric fields and are not particularly limited as long as they can control the transmittance of light, and liquid crystal compounds currently developed or to be developed may be used, for example, the description of reactive liquid crystal compound of the above-mentioned coatable polarizer may be equally applied thereto.

The liquid crystal compound may contain a chiral nematic (cholesteric) liquid crystal compound, and the chiral nematic liquid crystal compound may contain a nematic liquid crystal compound and a chiral compound.

The nematic liquid crystal compound has arrangement in which a long-rod-shaped molecules are parallel to each other, and there is no regularity in a center position of the molecules, but order in a direction of a molecular axis. Each molecule of the nematic liquid crystal compound may be freely moved in a long-axial direction and viscosity thereof is small and liquidity is good, and upward and downward direction of each molecule are almost equal and polarization is canceled and is not generally ferroelectricity. A type of the nematic liquid crystal compound is not particularly limited, and can be used without limitation as long as it contains a mesogenic group.

The chiral compound has a symmetric space frame structure like relationship of left and right hands, and a chemical structure or a physical property are equal, but is in mirror relationship and is a compound with a different space frame structure. When the nematic liquid crystal compound contains a certain content of the chiral compound, a spiral period is induced. A type of the chiral compound is not particularly limited as long as it can induce the desired spiral period without damaging liquid crystalline of the liquid crystal compound, for example, without damaging nematic regularity.

The chiral compound to induce the spiral period to the liquid crystal compound may need to contain at least chirality in a molecular structure. For example, the chiral compound may be a compound having one or two or more asymmetric carbons, a compound with an asymmetric point on a heteroatom such as chiral amine or chiral sulfoxide, or a compound with an optically active site with axially asymmetric such as cumulene or binaphthol. For example, the chiral compound may be a low molecular compound with a molecular weight of 1,500 or less. For example, the chiral compound may use a commercial chiral nematic liquid crystal, for example, a chiral dopant liquid crystal S-811 commercialized by Merck, Paliocolor LC 756 (manufactured by BASF), etc., but is not limited thereto.

The chiral nematic liquid crystal compound may contain 75 to 99% by weight of the nematic liquid crystal compound and 1 to 25% by weight of the chiral compound based on the total weight of the chiral nematic liquid crystal compound, but is not limited thereto. The contents of the nematic liquid crystal compound and the chiral compound are appropriately adjusted within the above ranges to adjust the spiral period of the chiral nematic liquid crystal compound, i.e., may adjust a pitch. The pitch of the chiral nematic liquid crystal compound is not particularly limited, but may be ranged from 5 to 20 μm.

A liquid crystal driving method of the liquid crystal layer 300 is not particularly limited, for example, may use a twisted nematic (TN) mode, a super twisted nematic (STN) mode, an in-plane switching (IPS) mode, a fringe-field switching (FFS) mode, a vertical alignment (VA) mode, etc., and preferably may use the TN mode.

As an example in which polymer is contained in the conventional liquid crystal layer, a polymer dispersed liquid crystal (PDLC) is known. The polymer dispersed liquid crystal exists while the liquid crystal compound is phase-dispersed in the form of a droplet or a capsule in a polymer, the phase-dispersed liquid crystal compound having the form of a droplet or a capsule are arranged in an irregular direction and cannot have uniform initial alignment. In other words, the polymer dispersed liquid crystal (PDLC) maintains an opaque state (light blocking mode) when no voltage is applied, as liquid crystal compounds have an irregular arrangement and scatter incident light, and maintains a transparent state (light transmissive mode) when voltage is applied, as the liquid crystal compounds are aligned in one direction to allow the incident light to pass through. However, since the light blocking mode of the polymer dispersed liquid crystal (PDLC) uses a property of incident light being scattered by the irregular arrangement of the liquid crystal compounds, there is a technical limitation in that a light blocking rate is somewhat unsatisfactory as the light scattered in any direction is not controlled, and the light blocking mode has a disadvantage of high power consumption because it is necessary to maintain voltage applied in order to implement the light transmissive mode.

The liquid crystal layer 300 of the present disclosure contains the polymer network 310 and the liquid crystal compound 320, and the liquid crystal compound 320 is arranged with the uniform initial alignment. The liquid crystal layer 300 of the present disclosure contains the polymer network 310 but the liquid crystal compound 320 contained together is not phase-dispersed in the form of a droplet or a capsule and exists while being mixed with the polymer network 310, and the liquid crystal compound 320 is arranged with the uniform initial alignment in the liquid crystal layer, which are differences from the conventional polymer dispersed liquid crystal (PDLC). Likewise, the liquid crystal layer 300 of the present disclosure containing the polymer network 310 and the liquid crystal compound 320 arranged with the uniform initial alignment can implement the light transmissive mode and the light blocking mode by adjusting the transmittance of light incident in one direction or a plurality of directions according to electric fields generated by the transparent conductive layer 200. Therefore, compared to the conventional polymer dispersed liquid crystal implementing the light blocking mode by scattering incident light, the liquid crystal layer 300 can provide excellent transmittance. Furthermore, the variable transmittance optical stack of the present disclosure may appropriately adjust a light transmitting axis of the polarizing plate 100 and an optical axis of the liquid crystal layer 300 to implement the light transmissive mode when not applying voltage. Furthermore, compared to the polymer dispersed liquid crystal with irregularly arranged liquid crystal, the variable transmittance optical stack of the present disclosure has an advantage of reducing power consumption in comparison to the conventional polymer dispersed liquid crystal in terms that applied voltage required for driving liquid crystal is low.

The liquid crystal layer 300 may contain a cured product of a composition for forming the liquid crystal layer, which contains a polymerizable monomer and the liquid crystal compound.

The polymerizable monomer is a compound forming the polymer network by photopolymerization reaction or thermalpolymerization reaction, and is not particularly limited. For example, the polymerizable monomer may contain acrylate-based monomer, and may contain one or more types selected from a group consisting of isobornylacrylate, caprolactoneacrylate, triethylene glycol diacrylate, trimethylolpropane triacrylate, and pentaerythritol triacrylate and dipentaerythritol pentaacrylate.

The polymerizable monomer may contain one or more monomers selected from a mono-functional group monomer to a four-functional group monomer, and preferably may contain a three-functional group monomer. The multi-functional group polymer does not affect liquid crystal and has excellent compatibility with liquid crystal, and can implement appropriate phase-dispersion with liquid crystal, which are advantages.

The composition for forming the liquid crystal layer may contain 10 to 30% by weight of the polymerizable monomer with respect to the total weight of the composition and preferably may contain 10 to 20% by weight. When the composition for forming the liquid crystal layer contains the polymerizable monomer in the above content range, it is preferable with advantages such that the curing of the polymer network formed as described above is sufficient and a cell gap of the liquid crystal layer can be stably maintained and excellent light transmittance and adhesion.

A method for forming the liquid crystal layer 300 by using the composition for forming the liquid crystal layer is not particularly limited. For example, the liquid crystal layer 300 may be formed by applying the composition for forming the liquid crystal layer on the first transparent conductive layer having a rubbing-aligned surface and then photo-curing or thermal-curing the applied part.

Apart from being able to stably maintain a cell gap without a sealant and a spacer as containing the polymer network 310 in the liquid crystal layer 300, the variable transmittance optical stack according to the present disclosure may contain one or more of a sealant and a spacer if necessary within a range that does not deteriorate the objectives of the present disclosure.

The sealant may contain curable resins as base resins. As the base resins, UV curable resins or heat curable resins that are known to be usable for sealants in the art may be used. The UV curable resins may be polymers of UV curable monomers. The heat-curable resins may be polymers of heat-curable monomers.

As the base resins of the sealant, for example, acrylate-based resins, epoxy-based resins, urethane-based resins, phenol-based resins, or compounds of these resins may be used. According to an embodiment, the base resins may be acrylate-based resins, and the acrylate-based resins may be polymers of acrylic monomers. For example, the acrylic monomers may be multifunctional acrylate. According to another embodiment, the sealant may contain monomer substances in addition to the base resins. For example, the monomer substances may be monofunctional acrylate. In the specification, the monofunctional acrylate may mean compounds having one acryl group, and the multifunctional acrylate may mean compounds having two or more acryl groups. The curable resins may be cured by UV irradiation and/or heating. The UV irradiation condition or heat condition may be performed appropriately within the scope that does not damage the objective of the present disclosure. In case of need, the sealant may contain initiators, for example, optical initiators or heat initiators.

The sealant may be provided in a method commonly used in the art and, for example, may be formed drawing a sealant at an outer portion of the liquid crystal layer (i.e., inactivate region) with a dispenser having a nozzle.

The spacer may include at least one spacer among a ball spacer and a column spacer, and specifically, may preferably be a ball spacer. The ball spacer may include one or more ball spaces and preferably has a diameter ranged from 1 to 10 μm. Furthermore, when viewed in a planar direction, a region where the ball spacer is occupied in the liquid crystal layer 300 is preferably 0.01 to 10% of the area of the liquid crystal layer 300 in an aspect of improvement of user's visibility and transmittance in a light transmissive mode.

The alignment film 400 is not particularly limited as long as it adds the orientation to the liquid crystal compounds. For example, the alignment film 400 may be manufactured by coating and curing an alignment film coating composition containing aligned polymers, photopolymerization initiators, and solvent. Although the aligned polymer is not particularly limited, the aligned polymer may be polyacrylate-based resin, polyamic resin, polyimide-based resin, polymer having cinnamate groups, etc. and may use polymer capable of expressing orientation, the polymer being currently developed or to be developed.

According to an embodiment, the first alignment film 400-1 and the second alignment film 400-2 may be aligned by a rubbing manner. The liquid crystal layer 300 included in the variable transmittance optical stack of the present disclosure contains a polymer network 310 as described above, and the polymer network may be formed by a cross-linking reaction of polymerizable compounds. When forming the polymer network 310, in order to maintain the uniform initial alignment of a liquid crystal compound 320 in the liquid crystal layer, it is preferable to use an alignment film having strong surface anchoring energy. The rubbing method using a rubbing process and the optical alignment method using UV rays may be used as a formation method of the alignment film, and generally the optical alignment method has week surface anchoring energy than the rubbing method. More specifically, an alignment film formed by the rubbing method has surface anchoring energy about $1\times10^{-3}$ J/m2, and an alignment film formed by the optical alignment method has surface anchoring energy about $1\times10^{-6}$ J/m². Therefore, when the polymer network 310 is formed in the liquid crystal layer 300, in terms of maintaining the uniform initial alignment of the liquid crystal compound 320, it is preferable for the alignment film 400 of the present disclosure to be aligned by the rubbing method. When the alignment film 400 is aligned by the optical alignment method, in forming the polymer network 310, the liquid crystal compound 320 does not maintain the uniform initial alignment to cause a problem in that a function adjusting optical transmittance is deteriorated.

The variable transmittance optical stack of the present disclosure may include other members without affecting the objectives of the present disclosure and, for example, may include the pressure-sensitive adhesive/adhesive layer 500 (referring to 3) and may include an ultraviolet rays absorption layer, a hard coating layer, etc.

The pressure-sensitive adhesive/adhesive layer 500 may be formed using an adhesive or a pressure-sensitive adhesive, and have appropriate pressure sensitive adhesion/adhesion to prevent peeling, bubbles, etc. from occurring when handling the optical stack, and preferably have transparency and thermal stability.

The adhesive may adopt an adhesive currently developed or to be developed, for example, may use photocurable adhesive.

The photocurable adhesive provides strong adhesion by being crosslinked and cured by receiving active energy rays such as ultraviolet (UV), electron beam (EB), etc., and may be composed of reactive oligomers, reactive monomers, photopolymerization initiators, and the like.

The reactive oligomers are important components that determine the properties of adhesive, and form polymer binding by photopolymerization to form a cured film. For example, the available oligomers may be polyester-based resin, polyether-based resin, polyurethane-based resin, epoxy-based resin, polyacryl-based resin, silicon-based resin, and the like.

The reactive monomers may serve as crosslinker, diluent of the reactive oligomers described above, and affect adhesion characteristics. For example, the available reactive monomers may be monofunctional monomers, multifunctional monomers, epoxy-based monomers, vinyl ethers, cyclic ethers, and the like.

The photopolymerization initiator may absorb light energy to generate radicals or cations to initiate photopolymerization, and a proper kind may be selected and used depending on photopolymerization resin.

The pressure-sensitive adhesive may use a pressure-sensitive adhesive currently developed or to be developed. According to one or a plurality of embodiments, as the pressure-sensitive adhesive, acrylic-based pressure-sensitive adhesive, rubber-based pressure-sensitive adhesive, silicon-based pressure-sensitive adhesive, urethane-based pressure-sensitive adhesive, polyvinyl alcohol-based pressure-sensitive adhesive, polyvinyl pyrrolidone-based pressure sensitive adhesive, polyacrylamide-based pressure sensitive adhesive, cellulose-based pressure sensitive adhesive, vinylalky ether-based pressure sensitive adhesive and the like. The pressure-sensitive adhesive is not particularly limited as long as it has pressure-sensitive adhesion and viscoelasticity. For ease of acquisition, preferably, the pressure-sensitive adhesive may include acrylic-based pressure-sensitive adhesive, for example, may be (meth) acrylate copolymers, crosslinkers, solvents, and the like.

The crosslinkers may adopt crosslinkers currently developed or to be developed and, for example, polyisocyanate compounds, epoxy resins, melamine resins, urea resins, dialdehydes, methylol polymers, etc., and may preferably contain polyisocyanate compounds.

The solvents may include common solvents used in the field of resin compositions. For example, the solvents may use solvents such as: alcohol-based compounds such as methanol, ethanol, isopropanol, butanol, propylene glycol methoxy alcohol, and the like; ketone-based compounds such as methyl ethyl ketone, methyl butyl ketone, methyl isobutyl ketone, diethyl ketone, dipropyl ketone, and the like; acetate-based compounds such as methyl acetate, ethyl acetate, butyl acetate, propylene glycol methoxy acetate, and the like; cellosolve-based compounds such as methyl cellosolve, ethyl cellosolve, propyl cellosolve, etc.; hydrocarbon-based compounds such as hexane, heptane, benzene, toluene, xylene, and the like. The solvents may be used alone or combination of two or more types.

The thickness of the pressure sensitive adhesive/adhesive layer 500 may be appropriately determined depending on a type of resins serving as the pressure sensitive adhesive/ adhesive, the strength of the pressure sensitive adhesive/ adhesive, the environment where the pressure sensitive adhesive/adhesive is used, and the like. According to an embodiment, the pressure sensitive adhesive/adhesive layer may have a thickness between 0.01 and 50 µm in order to ensure sufficient adhesion and minimize the thickness of the optical stack and, preferably, may have a thickness ranged from 0.05 to 20 µm and, more preferably, may have a thickness ranged from 0.1 to 10 µm.

The ultraviolet ray absorption layer is not particularly limited as long as it is to prevent deterioration of the optical stack due to UV rays. For example, the ultraviolet ray absorption layer may use salicylic acid-based ultraviolet absorber (phenyl salicylate, p-tert-butylsalicylate, etc.), benzophenone-based ultraviolet absorber (2,4-dihydroxybenzophenone, 2,2'-dihydroxy-4,4'-dimethoxybenzophenone, etc.), benzotriazole-based ultraviolet absorber (2-(2'-hydroxy-5'-methylphenyl)benzotriazole, 2-(2'-hydroxy-3',5'-di-tert-butylphenyl)benzotriazole, 2-(2'-hydroxy-3'-tert-butyl-5'-methylphenyl)benzotriazole, 2-(2'-hydroxy-3',5'-di-tert-butylphenyl)-5-chlorobenzotriazole, 2-(2'-hydroxy-3'-(3'',4'',5'',6''-tetrahydrophthalimide methyl)-5'-methylphenyl)benzotriazole, 2,2-methylenebis(4-(1,1,3,3-tetramethylbutyl)-6-(2H-benzotriazole-2-yl)phenol), 2-(2'-hydroxy-3'-tert-butyl-5'-methylphenyl)-5-chlorobenzotriazole, 2-(2'-hydroxy-3'-tert-butyl-5'-(2-octyloxicarbonylethyl)-phenyl)-5-chlorobenzotriazole, 2-(2'-hydroxy-3'-(1-methyl-1-phenylethyl)-5'-(1,1,3,3-tetramethylbutyl)-phenyl)benzotriazole, 2-(2H-benzotriazole-2-yl)-6-(linear and side chain dodecyl)-4-methylphenol, octyl-3-[3-tert-butyl-4-hydroxy-5-(chloro-2H-benzotriazole-2-yl)phenyl]propionate and 2-ethylhexyl-3-[3-tert-butyl-4-hydroxy-5-(5-chloro-2H-benzotriazole-2-yl)phenyl]propionate compounds, etc.), cyanoacrylate-based ultraviolet absorber (2'-ethylhexyl-2-cyano-3,3-diphenylacrylate, ethyl-2-cyano-3-(3',4'-methylene dioxyphenyl)-acrylate, etc.), triazine-based ultraviolet absorber, etc. The benzotriazole-based ultraviolet absorber or the triazine-based ultraviolet absorber that have high transparency and the excellent effect of preventing deterioration of the polarizing plate or the variable transmittance layer may be preferably used as the ultraviolet ray absorption layer, and the benzotriazole-based ultraviolet absorber having more appropriate spectral absorption spectroscopy absorption spectrum may be preferable. The benzotriazole-based ultraviolet absorber may be changed into "-Bis" and, for example, may be 6,6'-methylene bis(2-(2H-benzo[d][1,2,3]triazole-2-yl)-4-(2,4,4-trimethylpentane-2-yl)phenol), 6,6'-methylene bis(2-(2H-benzo[d][1,2,3]triazole-2-yl)-4-(2-hydroxyethyl)phenol), etc.

The hard coating layer is not particularly limited as long as it is to protect members such as the polarizing plate, the variable transmittance layer, etc. from external physical and chemical shocks, and hard coating layers currently developed or to be developed may be used thereto.

According to the embodiment, the hard coating layer may be formed by applying compositions for forming a hard coating layer on another member and then curing the layer with light or heat. The compositions for forming a hard coating layer are not particularly limited and, for example, may include photocurable compounds and a photoinitiator.

As the photocurable compounds and the photoinitiator, those commonly used in the art can be used without limitation, for example, the photocurable compounds may be photopolymerizable monomers, photopolymerizable oligomers, etc., for example, may be monofunctional and/or multifunctional (meth) acrylate, and the photoinitiator may be an oxime ester-based photoinitiator, etc.

In addition to the variable transmittance optical stack, the present disclosure includes a smart window including the same. Furthermore, the present disclosure includes a vehicle in which the smart window is applied to at least one of front windows, rear windows, side windows, sunroof windows, and inner partitions, and a building window including the smart window.

What is claimed is:

1. A variable transmittance optical stack comprising:
 a first polarizing plate;
 a first transparent conductive layer disposed on one surface of the first polarizing plate;
 a first alignment film disposed on the first transparent conductive layer;
 a second polarizing plate disposed opposite to the first polarizing plate;
 a second transparent conductive layer disposed on one surface of the second polarizing plate, and opposite to the first transparent conductive layer;
 a second alignment film disposed on the second transparent conductive layer; and
 a liquid crystal layer disposed between the first alignment film and the second alignment film,
 wherein the liquid crystal layer comprises a polymer network and a liquid crystal compound, wherein the liquid crystal layer does not comprise any of a sealant or a spacer,
 wherein the liquid crystal compound is arranged with uniform initial alignment,
 wherein at least one transparent conductive layer of the first transparent conductive layer and the second transparent conductive layer is disposed directly contacting the first polarizing plate or the second polarizing plate without an additional substrate between the at least one transparent conductive layer and the first polarizing plate or the second polarizing plate, and
 wherein the liquid crystal layer comprises a cured product of a composition for forming the liquid crystal layer, which comprises a polymerizable monomer and a liquid crystal compound,
 wherein the liquid crystal compound comprises a chiral nematic liquid crystal compound, and
 wherein a pitch of the chiral nematic liquid crystal compound is ranged from 5 to 20 µm.

2. The variable transmittance optical stack of claim 1, wherein a liquid crystal operating method of the liquid crystal layer is selected from the group consisting of a twisted nematic mode, a super twisted nematic mode, an in-plane switching mode, a fringe-field mode, and a vertical alignment mode.

3. The variable transmittance optical stack of claim 2, wherein the liquid crystal operating method of the liquid crystal layer is the twisted nematic mode.

4. The variable transmittance optical stack of claim 1, wherein the composition for forming the liquid crystal layer comprises 10 to 30% by weight of the polymerizable monomer with respect to the total weight of the composition.

5. The variable transmittance optical stack of claim 1, wherein the first alignment film and the second alignment film are aligned by a rubbing manner.

6. The variable transmittance optical stack of claim 1, wherein each of the first transparent conductive layer and the second transparent conductive layer comprises one or more types selected from the group consisting of transparent conductive oxide, metal, carbonaceous material, conductive polymers, conductive ink, and nanowires.

7. The variable transmittance optical stack of claim 1, wherein the at least one transparent conductive layer of the first transparent conductive layer and the second transparent conductive layer is formed by directly contacting with the first polarizing plate or the second polarizing plate with a highly adhesive layer between the first polarizing plate or the second polarizing plate and the at least one transparent conductive layer.

8. The variable transmittance optical stack of claim 1, wherein at least one polarizing plate of the first polarizing plate and the second polarizing plate comprises one or more types of functional layers selected from the group consisting of a protective layer, a retardation matching layer, and a refractive index-matching layer.

9. The variable transmittance optical stack of claim 1, wherein each of the first polarizing plate and the second polarizing plate has a thickness ranged from 30 μm to 200 μm.

10. The variable transmittance optical stack of claim 1, further comprising:
   one or more types selected from the group consisting of a pressure sensitive adhesive/adhesive layer, an ultraviolet ray absorption layer, and a hard coating layer.

11. A manufacturing method for the variable transmittance optical stack of claim 1.

12. A smart window comprising the variable transmittance optical stack of claim 1.

\* \* \* \* \*